(12) United States Patent
Chong

(10) Patent No.: US 10,572,485 B2
(45) Date of Patent: Feb. 25, 2020

(54) IN-MEMORY DENORMALIZED RDF DATA

(71) Applicant: ORACLE INTERNATIONAL CORPORATION, Redwood Shores, CA (US)

(72) Inventor: Eugene Inseok Chong, Concord, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 281 days.

(21) Appl. No.: 15/581,912

(22) Filed: Apr. 28, 2017

(65) Prior Publication Data
US 2018/0314737 A1 Nov. 1, 2018

(51) Int. Cl.
G06F 16/2455 (2019.01)
G06F 16/22 (2019.01)
G06F 16/248 (2019.01)

(52) U.S. Cl.
CPC ........ G06F 16/2456 (2019.01); G06F 16/221 (2019.01); G06F 16/2282 (2019.01); G06F 16/248 (2019.01)

(58) Field of Classification Search
CPC ............. G06F 16/2456; G06F 16/2282; G06F 16/248; G06F 16/221
USPC ....................................................... 707/769
See application file for complete search history.

(56) References Cited

U.S. PATENT DOCUMENTS

| 8,078,646 | B2* | 12/2011 | Das | G06F 16/2255 707/802 |
| 8,078,652 | B2* | 12/2011 | Basu | G06F 16/2462 707/825 |
| 9,031,932 | B2* | 5/2015 | Idicula | G06F 16/283 707/714 |
| 2009/0138437 | A1* | 5/2009 | Krishnamoorthy | G06F 16/24534 707/999.003 |
| 2009/0138498 | A1* | 5/2009 | Krishnamoorthy | G06F 16/24534 707/999.103 |

* cited by examiner

Primary Examiner — Shahid A Alam
(74) Attorney, Agent, or Firm — Vista IP Law Group, LLP

(57) ABSTRACT

Systems for database query processors. In a method embodiment, processing commences upon receiving a first set of a plurality of database language queries that reference a normalized column in an RDF table and that also includes a JOIN clause that references both the normalized column in the RDF table and a corresponding lookup table (e.g., a denormalization dictionary) that contains both normalized RDF data and denormalized RDF data. An in-memory table is allocated and formatted to comprise virtual columns that correspond to denormalized RDF data. Virtual columns of the in-memory table are populated with denormalized RDF data. In case of receipt of a SPARQL query, the incoming query is first translated into non-SPARQL database statements which are in turn recoded into database language statements that use lookup functions to lookup the denormalized RDF data from the virtual columns of the in-memory table rather than by incurring expensive disk I/O operations.

20 Claims, 10 Drawing Sheets

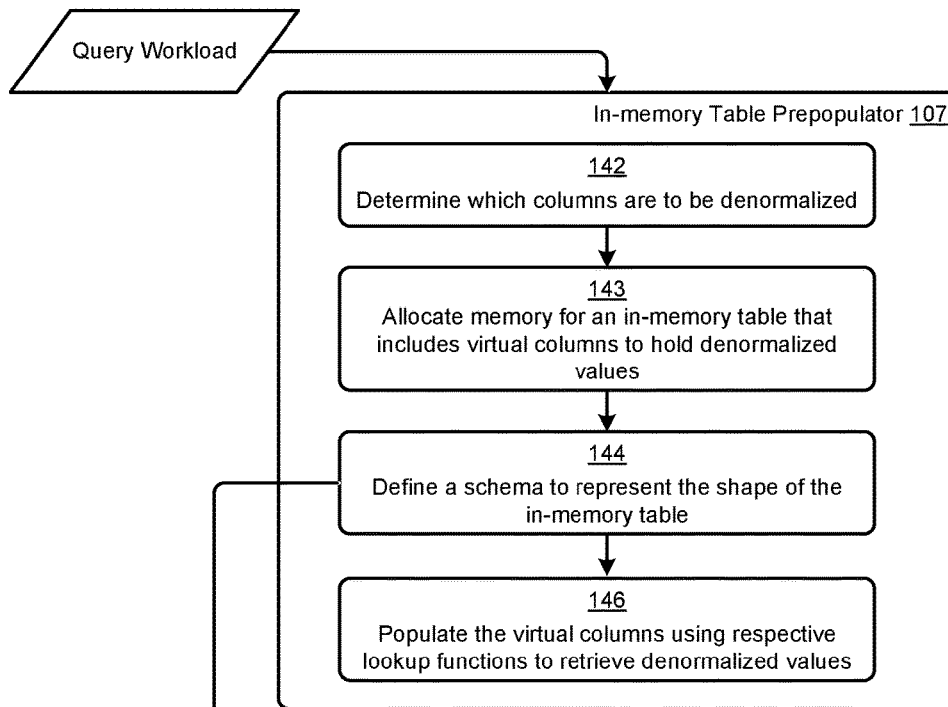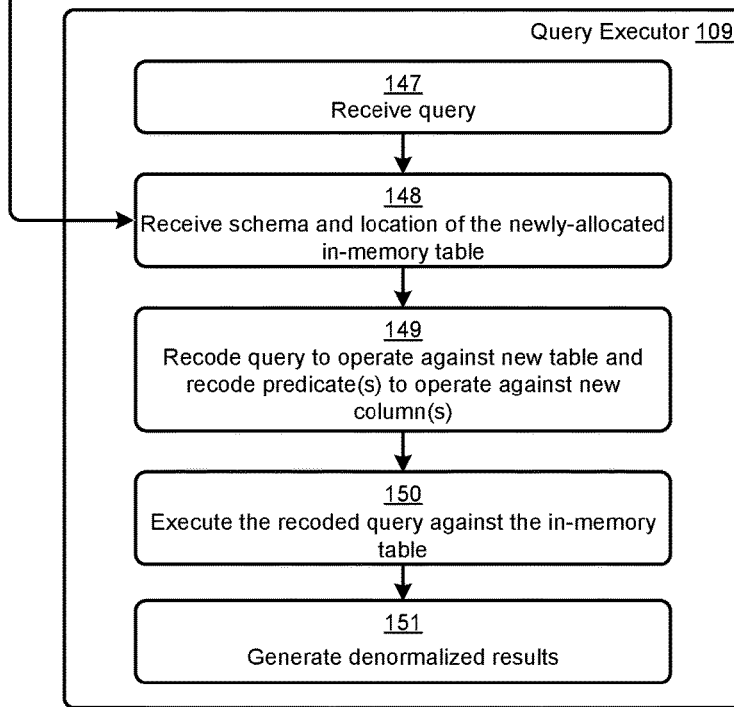
FIG. 1B2

IN-MEMORY DENORMALIZED RDF DATA

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The resource description framework (RDF) is powerful technology that is used extensively in combination with SPARQL queries. RDF defines a data model that codifies statements about entities in the form of subject-predicate-object expressions, known as triples. The subject denotes the entity itself, and the object denotes traits or aspects of the entity. The predicate of the triple expresses a relationship between the subject and the object. For example, the statement "exercise promotes health" can be expressed as a triple where "exercise" is the subject, "promotes" is the predicate, and "health" is the object. Any relationship between any subject and any object can be expressed as an RDF triple. The ability for RDF triples to model complex concepts involving any arbitrary relationships between subjects, predicates and objects has led to increased use of RDF triples in database settings.

The term SPARQL refers to a protocol using RDF that is designed as a language for querying and manipulating RDF data. SPARQL became an official World Wide Web Consortium (W3C) recommendation in 2008. Database engines that process queries written in SPARQL are able to retrieve and manipulate data stored in the resource description framework format. SPARQL includes constructions for specifying a query that includes "triple" patterns that are processed against conjunctions, disjunctions, etc.

Often, when RDF data is stored or represented in a database or other type of data store, the RDF data is stored as normalized data tables. Normalizing data in database tables seeks to remove data redundancy, and hence to promote ease of maintenance, data integrity, data consistency, and data storage space savings. As one example, while the semantics of the phrase, "Bob the village baker knows Sam the shoemaker" could be stored as a subject-predicate-object triple (specifically, "subject='Bob the village baker'", "predicate='knows'", and "object='Sam the shoemaker'"), it could also be stored in a more compact, normalized form. Continuing this example, the phrase "Bob the village baker" could be stored as a numeric value '1' (or other short identifier) that merely refers to an entry in a dictionary that includes a relationship between the numeric value '1' and the subject phrase, "Bob the village baker". A similar normalization technique and respective entry into the dictionary can be applied to the predicate as well as to the object, such as assigning the numeric value '3' (or other short identifier) to the object phrase, "Sam the shoemaker". An RDF triple such as, "Bob the village baker knows Sam the shoemaker" can be stored a "'1' knows '3'", where the normalized values of '1' and '3' can be denormalized in order to reconstruct the original RDF triple, "Bob the village baker knows Sam the shoemaker".

When RDF data comprising many occurrences of subject-predicate-object entries in tables are stored in normalized forms, the aggregate data storage requirements are typically much smaller.

In many cases, RDF data is stored in relational database tables. When applying the foregoing normalization techniques, the relational database tables comprising RDF triples are normalized for their respective subjects, predicates, and objects. The RDF data stored in relational database tables can thus be stored in a normalized form, (e.g., where the normalized values are stored in a first database table and the denormalized values are stored in a second database table). Queries can be performed over the data, where a join operation is performed between the first database table and the second database table with a join key. The result of the join operation can be used by a database processing system to generate denormalized query results.

Unfortunately, the computing costs involved in performing join operations are often very high, especially if there are a large number of entries involved in the tables to be joined. Software applications involving semantic queries (e.g., involving RDF data and/or SPARQL queries) often need denormalized results, thus incurring the aforementioned high costs involved in performing joins over the multiple tables to obtain denormalized results.

Therefore, what is needed is a technique or techniques to improve over legacy techniques and/or over other considered approaches to reduce the computational expense of returning denormalized results of a query pertaining to RDF data triples that are stored in a normalized form within a relational database system. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides describes techniques used to reduce the computational expense of returning denormalized results of a query pertaining to RDF data triples that are stored in a normalized form within a relational database system. The present disclosure describes techniques used in systems, methods, and in computer program products. In one embodiment, a database language query that includes a reference to a normalized column in a first RDF table and a join clause that references a second RDF table having corresponding denormalized RDF data is received. Before executing the query, an in-memory table is defined and populated to hold a portion of the normalized RDF data and its corresponding denormalized RDF data. The join clause of the received database language query is recoded into a set of database operations that implement lookup functions to retrieve denormalized RDF data from the in-memory table. Results corresponding to execution of the recoded query are the same as if the originally-received database language query had been executed.

BRIEF DESCRIPTION OF THE DRAWINGS

The drawings described below are for illustration purposes only. The drawings are not intended to limit the scope of the present disclosure.

FIG. 1B1 and FIG. 1B2 depict flowcharts showing an in-memory table prepopulator and a query executor that facilitates high-performance processing of queries using normalized data and a denormalization dictionary, according to an embodiment.

DETAILED DESCRIPTION

Figure 1A:
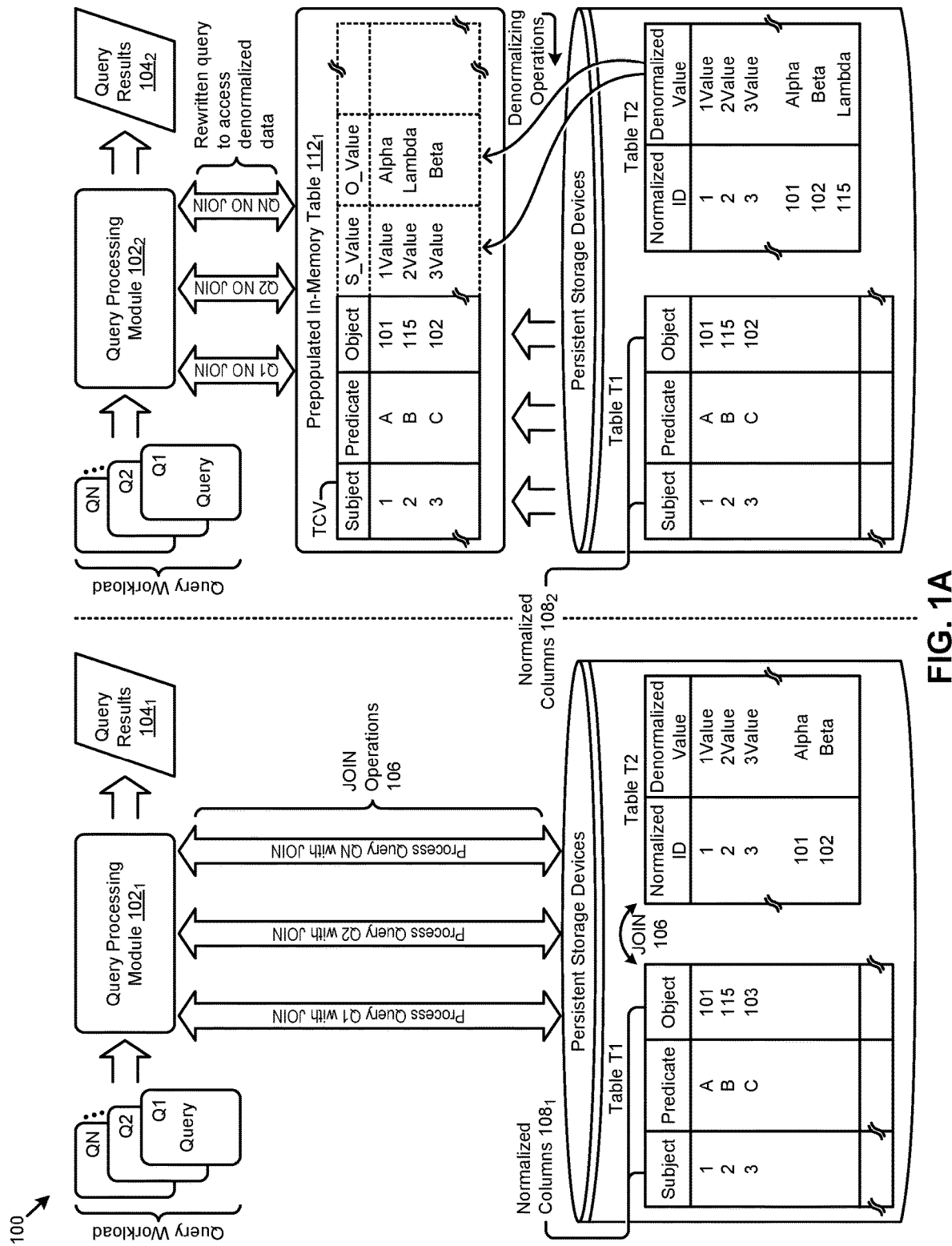
FIG. 1A presents a query transformation technique that facilitates high-performance processing of JOIN queries using normalized data and a denormalization dictionary, according to some embodiments.

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Semantic web applications often rely on results of operations that manipulate RDF data (e.g., through "triple" patterns, conjunctions, disjunctions, etc.). Many relational database systems use normalized data to reduce or remove data redundancy that is often present in unnormalized relational tables of a database. When using normalized data that is stored as short, compact IDs rather than the unnormalized data itself, a dictionary can be populated and maintained to map each of the short, compact IDs to their respective unnormalized value. Strictly as an example, the phrase, "Bob the village baker knows Sam the shoemaker" could be stored as a subject-predicate-object triple that has been recoded into a subject-predicate-object triple composed of only IDs. Specifically, the subject 'Bob the village baker' could be referred to and stored using a first ID, namely "ID='1'". The predicate 'knows' could be referred to and stored using a second ID, namely "ID='2'", and the object 'Sam the shoemaker' could be referred to and stored using a third ID, namely "ID='3'". Continuing this example, the phrase "Bob the village baker" could be stored as a numeric value '1' (or other short identifier) that merely refers to a particular entry in a dictionary that includes a relationship between the numeric value '1' and the subject phrase, "Bob the village baker". A similar normalization technique and respective entry into the dictionary can be applied to the predicate as well as to the object, such as assigning the numeric value '3' (or other short identifier) to the object phrase, "Sam the shoemaker". When RDF data comprising many occurrences of subject-predicate-object entries in tables are stored in normalized forms and then manipulated (e.g., queried, joined, etc.) using such normalized forms, the aggregate data storage requirements are typically much smaller.

In many cases, RDF data is stored in relational database tables. When applying the foregoing normalization techniques, the relational database tables comprising RDF triples are normalized for their respective subjects, predicates, and objects. The RDF data stored in relational database tables can thus be stored in a normalized form, where the normalized values are stored in a first table that identifies the RDF triples by way of the numeric values, and a second dictionary table stores the corresponding denormalized values. In some implementations, RDF triples data is stored in an RDF_LINK$ table that is populated with IDs of some or all of a subject, a predicate, and an object. An RDF data dictionary is a table that is composed of rows, each row including an RDF_VALUE in row-wise correspondence to a respective normalization ID.

Queries can be performed over the normalized data tables, and query processing can be performed so as to generate denormalized query results where join operations are performed between the first table having the normalized RDF data and the second table having the denormalized values. However, as previously noted, join operations typically require very high computing costs, especially if there are a large number of entries involved in the tables to be joined.

Embodiments in accordance with the present disclosure address the problem of the computationally expensive cost of performing JOINs on normalized data to obtain a set of query results. More specifically, the cost of performing denormalization JOINs when reading and writing to/from a storage device (e.g., a hard disk drive) is typically very high.

Using the herein-disclosed techniques, denormalized query results can be efficiently generated by performing queries against an in-memory table structure having a first set of one or more columns populated from the underlying normalized table and a second set of one or more "virtual" columns having denormalized values populated from the dictionary table.

FIG. 1A presents a query transformation technique that facilitates high-performance processing of JOIN queries using normalized data and a denormalization dictionary. As an option, one or more variations of the query transformation technique or any aspect thereof may be implemented in the context of the architecture and functionality of the embodiments described herein. The query transformation technique or any aspect thereof may be implemented in any environment.

Before describing the details of the improved techniques of embodiments of the current invention, it is instructive to review the problems involved when performing the less-optimal approach of performing real-time join operations when processing queries against the normalized RDF data, e.g., as illustrated in the left-hand side of FIG. 1A. Here, the database system of environment 100 includes a query processing module $102_1$ that receives database queries (e.g., Q1, Q2, QN), processes the queries, and produces query results (e.g., query results $104_1$) corresponding to the received queries. In this and other embodiments, the queries are from a query workload derived from a set of SPARQL queries that operate over RDF data.

The shown database system of environment 100 also depicts two tables, "Table T1" and "Table T2" that are stored in persistent storage devices. In this example, table T1 stores RDF triples in the form of rows, each comprising a subject (e.g., the column labeled "Subject"), a predicate (e.g., the column labeled "Predicate"), and an object (e.g., the column labeled "Object"). Strictly as an example, table T1 is shown as having some data in normalized forms such as the subject column (in normalized columns $108_1$) and the object column, while data stored in other columns (e.g., the "Predicate" column) are not stored using normalized values. Table T2 stores the denormalized values for some or all of the normalized values in table T1. Each row in table T2 correlates a normalized value with a denormalized value. As shown, the first column holds a normalized ID value and the second column holds the denormalized value that corresponds to the normalized ID value in the same row.

In accordance with the operation of query processing module $102_1$, a query that is intended to retrieve RDF data in a denormalized form from these table can be accomplished through use of JOIN operations 106 that are performed between table T1 and table T2. Any row in table T1 can be joined with table T2, where the normalized ID value is used as a join key to perform the join operation.

However, as noted above, such join operations are typically very computationally expensive. These costs could be excessive and prohibitive, especially when the join operation costs are multiplied as the number of queries and/or the volume of data in tables T1 and T2 increases.

The right-hand side of FIG. 1A illustrates an improved approach according to some embodiments of the invention, where an in-memory data structure is pre-populated with normalized data values to provide greater performance efficiencies when handling queries against RDF data stored in table T1.

In particular, table T1 (or just a subset of the rows of table T1 that correspond to a workload or virtual model) can be brought into the in-memory data structure (e.g., the shown table TVC). Table T1 forms the base set of columns for the in-memory table $112_1$, which is shown as the first three columns of the in-memory table $112_1$ (that exactly correspond to the same three columns from table T1). The in-memory table TVC is then augmented with one or more additional "virtual" columns to hold denormalized values for any of the normalized values from the first three columns from table T1. Therefore, the particular virtual columns to be specified and populated in prepopulated in-memory table $112_1$ correspond to the normalized columns $108_2$. The denormalized value in any row of any of the virtualized columns corresponds to a normalized value in that same row. For example, and as shown, the normalized value in the first row of the "Subject" column is "1" (e.g., representing a normalized ID value) and the denormalized value in the "S_Value" of the same row is "1Value" (e.g., representing the denormalized value for a "1" in the "Subject" column).

The advantage of having this in-memory structure is that there is no longer any need to perform a join between multiple tables to obtain query results having de-normalized values. This is because a single table (the in-memory table) now includes both the columns from table T1 (the subject, predicate, and object columns of an RDF LINKS table) as well as the virtual columns (S_value and O_value columns) having the denormalized values from table T2. Therefore, an appropriate query can be posed against this single table TVC that queries against the appropriate columns within the table to obtain denormalized values for any RDF triple.

The queries Q1, Q2, . . . Qn received by the query processing module $102_2$ may have been written with the expectation of being directed against the two separate tables T1 and T2, rather than a single table that includes column values from both tables. Therefore, the queries of the workload can be pre-processed by the query processing module $102_2$ so as to access the prepopulated in-memory table $112_1$. More specifically, query processing module $102_2$ is configured to read an incoming query, and then to recode the incoming query into a form that accesses the columns of prepopulated in-memory table $112_1$. As can be observed, the prepopulated in-memory table $112_1$ comprises a single table, namely table TVC, where each row that has a normalized data value in a particular column also has a denormalized data value in a corresponding virtualized column. An incoming query can be recoded into a query that accesses denormalized data, yet without incurring processing costs associated with JOIN operations 106. In this and other embodiments, a query processing module such as the shown query processing module $102_2$ processes the queries, and produces query results (e.g., query results $104_2$) that are identical to the query results that would be produced if using JOIN operations 106 (e.g., query results 104₁).

In some embodiments, the incoming queries are processed by the query processing module 102₂ to recode the queries into less expensive SELECT operations that are performed over the prepopulated virtual columns. As may be specified by the incoming query, query results are to be returned to the process that submitted the query. The returned query results are semantically identical to query results as if a JOIN operation had been executed against the separate T1 and T2 tables; however, the computing costs of performing the recoded SELECT-oriented query over a single table is much less than the computing costs than would have been incurred if a JOIN-oriented query were processed against the two tables.

The aforementioned in-memory virtual columns can be formed in memory using any known technique. One such technique is shown and described as pertains to FIG. 1B1.

FIG. 1B1 depicts a flowchart showing an in-memory table prepopulator 107 that facilitates high-performance processing of queries using normalized data and a denormalization dictionary. As an option, one or more variations of the flowchart or any aspect thereof may be implemented in the context of the architecture and functionality of the embodiments described herein. The flowchart or any aspect thereof may be implemented in any environment. The embodiment shown in FIG. 1B1 is merely one example of in-memory table prepopulator 107.

The in-memory table prepopulator 107 may include some or all of the contents from an underlying tables RDF LINKS table and the dictionary table. It is noted that it is often more efficient to only load relevant portions of the underlying data into the in-memory table rather than the entirety of that data. For example, it is noted that RDF data is often accessed in portions that correspond to a particular workload or virtual model. The workload or virtual model corresponds to a relatively smaller portion of a relatively larger repository of RDF data. As such, in some embodiments, only the relevant portion of the RDF data (e.g., partitions that correspond to the workload) are be brought into an in-memory table. Bringing that portion or portions of the RDF data into the in-memory table can be performed one time, and once accomplished, all of the queries that correspond to the workload can use the in-memory data, thus reducing or eliminating any operations that access the RDF data from persistent storage.

As used herein, a workload is a specification that defines a set of columns and/or rows of one or more tables, which portions are used in one or more queries (e.g., query Q1, query Q2, etc.). In some cases, a user can define a virtual model based on a set of named columns whose values are needed during execution of queries of the workload. In the processes for formation of the prepopulated in-memory table, the named columns of the virtual model become virtual columns of the prepopulated in-memory table. In most cases, the row entries in the virtual columns include many duplicates throughout the range of rows of the in-memory table. For example, to the extent that there are duplicate normalized values in the normalized columns throughout the range of rows of the prepopulated in-memory table, then there will be as many duplicate values (e.g., of denormalized data) in the data of the virtual columns throughout the corresponding range of rows of the in-memory table. In many situations, the duplicate values can be compressed, thus taking up less space in the in-memory table.

As shown, a query workload is given, and the in-memory table prepopulator 107 analyzes the query workload to determine which rows/columns of the underlying data need to be copied into the in-memory table and/or denormalized. In some cases, a workload refers to a particular partition of an RDF LINK table. In other cases, a workload refers to multiple particular partitions of an RDF LINK table. In any such cases, whether pertaining to a single partition or to multiple partitions, the full extent of the data from the LINK table is known before processing any query of the workload. As such some or all of the full extent of the data from the LINK table can be brought into the in-memory table. Moreover, an incoming JOIN-oriented query would include specifications of join operations, which specifications include specification of at least one column that is common to at least two tables. Using this technique, or any other technique, the virtual columns against which query result data is to be normalized can be determined (step 142).

In the example of FIG. 1A, the columns for "Subject" and "Object" are normalized columns 108₂. Upon determination of which columns are to be denormalized (e.g., the normalized "Subject" and "Object" columns), processing is undertaken (step 143) to allocate memory for an in-memory table that includes virtual columns to hold denormalized values for which query result data is to be normalized (e.g., where the base columns for the table correspond to the columns from the LINKS table). Processing steps are undertaken (at step 144) to define a schema that represents the in-memory tables and/or virtual columns for which query result data is to be normalized. The schema includes as many additional columns as are needed for population of the aforementioned virtual columns. These additional columns, once populated, will hold in-memory denormalized values (e.g., for "S_Value" and "O_Value"). In accordance with the columns of the schema, and in accordance with the size (e.g., number of rows) of the partition or partitions, sufficient memory to hold a corresponding in-memory table is allocated.

Once the schema of the in-memory table has been defined, that table can now be populated from the underling RDF LINKS and dictionary tables (step 146). This can be accomplished by going row-by-row through appropriate set of rows within the LINKS table, where (1) an entire row of data is obtained, then (2) combining that row of data with additional data for corresponding denormalized values for any normalized values within that row, (3) organizing that data to match the schema of the in-memory table, and then (4) loading that combined data into a single row within the in-memory table.

As shown by the example in the right-hand side of FIG. 1A, the schema of the in-memory table 112₁ include five columns, where the first column corresponds to the first column of table T1, the second column corresponds to the second column of table T1, the third column corresponds to the third column of table T1, the fourth column corresponds to the denormalized value of the value in the first column, and the fifth column corresponds to the denormalized value of the value in the third column.

Consider the first row in table T1, which includes three columns having the normalized value "1" in the first column (Subject Column), denormalized value "A" in the second column (Predicate column), and normalized value "101" in the third column (Object column). From checking table T2, it can be seen that the denormalized value "1Value" corresponds to the normalized value "1" in the first Subject column, and which therefore is the value to be placed into the "S_Value" column in the in-memory table. In addition, it can be seen that the denormalized value "Alpha" corresponds to the normalized value "101" in the third "Object" column, and which therefore is the value to be placed into the "O_Value" column in the in-memory table. Therefore, all of this data is packaged up into a single row that matches the schema of the in-memory table $112_1$, where the first column for this row includes the value for the first column of this row in table T1 ("1"), the second column includes the value for the second column of this row in table T1 ("A"), the third column includes the value for the third column of this row in table T1 ("101"), the fourth column includes the denormalized value corresponding to the normalized value in the first column ("1Value"), and the fifth column includes the denormalized value corresponding to the normalized value in the third column ("Alpha"). This newly formed row is then inserted as the first row of the in-memory table $112_1$. This process repeats for every appropriate row in table T1 that needs to be copied into the in-memory table until all rows have been processed.

Once the operations of the in-memory table prepopulator 107 have completed, any number of queries can be performed using a configured instance of a query processing module, such as the query executor of FIG. 1B2.

FIG. 1B2 depicts a flowchart showing a query executor that facilitates high-performance processing of queries using normalized data and a denormalization dictionary. The embodiment shown in FIG. 1B2 is merely one example of a query executor 109.

As shown, the query executor receives queries of the workload (step 147). The schema as generated in step 144 is retrieved and used to map over the in-memory table (step 148) that had been previously allocated. The query executor 109 recodes an incoming query to operate over the in-memory table. More particularly, the query executor 109 recodes an incoming query (at step 149) to access the sets of virtual columns that are included in the in-memory table that had been formed by the in-memory table prepopulator 107. The query executor 109 further serves to execute the recoded query (at step 150) against the in-memory table to generate query results comprising denormalized values (step 151). The generated query results are returned to the requestor. The mechanism to return results to the requestor can include any known technique (e.g., shared memory, message passing, database table reference, etc.) whereby a database system can communicate query results to a requestor.

One-Time Prepopulation of Virtual Columns with Denormalized Data

Figure 2A:
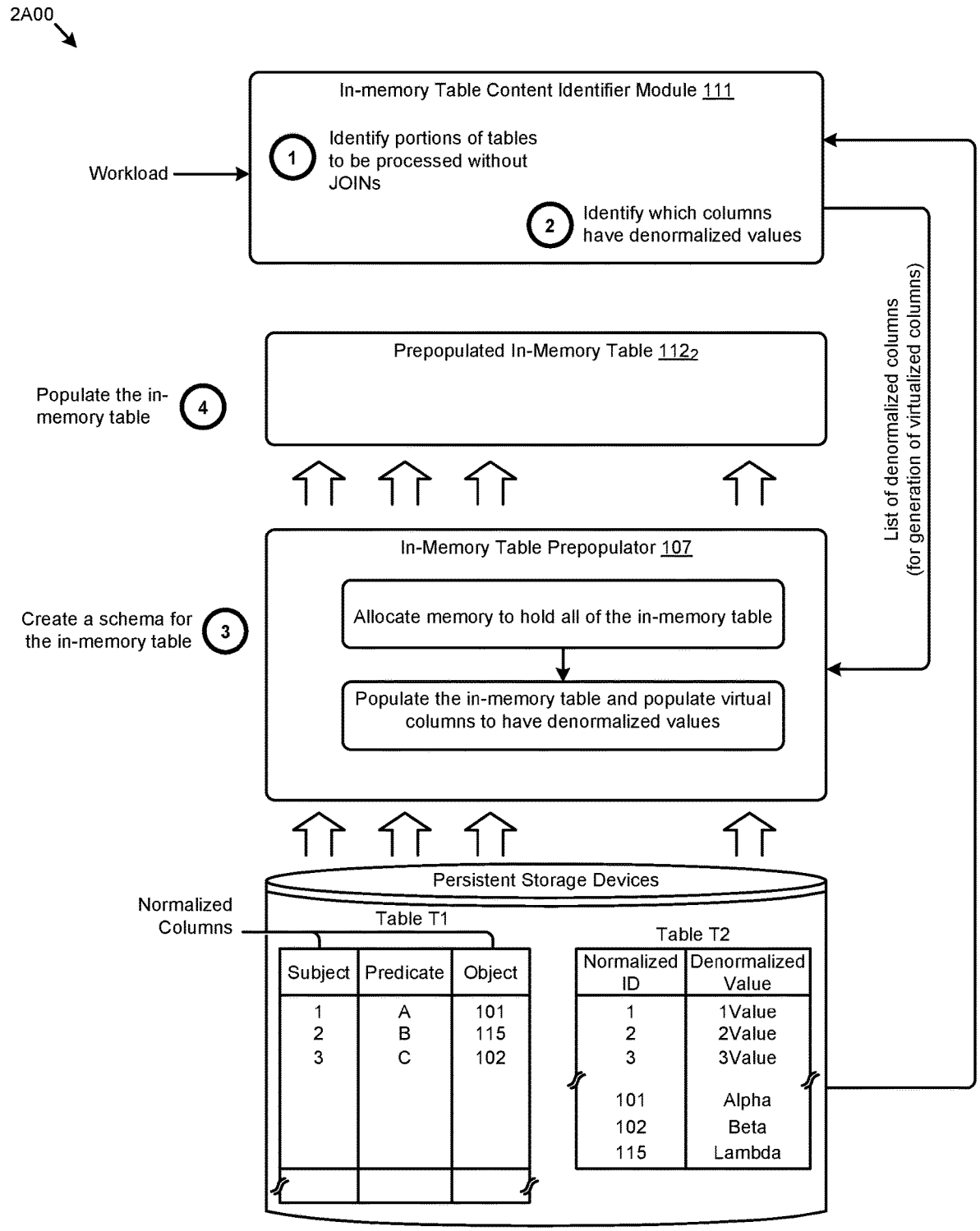
FIG. 2A presents an in-memory table prepopulation technique in a system that facilitates high-performance processing of RDF queries using normalized RDF data and a denormalization dictionary, according to some embodiments.

FIG. 2A presents an in-memory table prepopulation technique 2A00 in a system that facilitates high-performance processing of RDF queries using normalized RDF data and a denormalization dictionary.

A description of a workload is received at the shown in-memory table content identifier module 111. The workload is analyzed (operation 1) to identify portions of RDF tables that are to be the subject of later-received queries. These later-received queries will be recoded such that any JOINs in the later-received queries are recoded to use SQL operations over a prepopulated in-memory table $112_2$. In addition to identification of underlying RDF tables (at operation 1), the in-memory table content identifier module 111 determines which columns of the tables would be subjected to normalization (at operation 2).

The workload, possibly being defined by a virtual model, references certain named tables, and/or a subset of rows, and/or a subset of columns over which queries of that workload can be executed. As shown, the in-memory table content identifier module 111 accesses tables that are stored on the persistent storage devices. In many cases, table metadata and/or workload metadata and/or virtual model metadata are also stored in persistent storage.

An in-memory table prepopulator 107 is situated in the system of FIG. 2A to be able to receive instructions from the in-memory table content identifier module 111. Such instructions include sufficient information for the in-memory table prepopulator 107 to perform retrieval operations from the persistent storage devices so as to populate the in-memory table. More specifically, and as shown, the in-memory table prepopulator 107 allocates memory for the in-memory table and then proceeds to populate the in-memory table with the identified RDF table data as well as with denormalized values corresponding to the identified RDF table columns.

A schema covering the soon-to-be prepopulated in-memory memory table is formed (at operation 3). Memory is allocated, and an in-memory table corresponding to the schema is prepopulated (at operation 4). The system of FIG. 2A is now in a configuration ready to process incoming queries that return denormalized query results without performing joins.

Figure 2B:
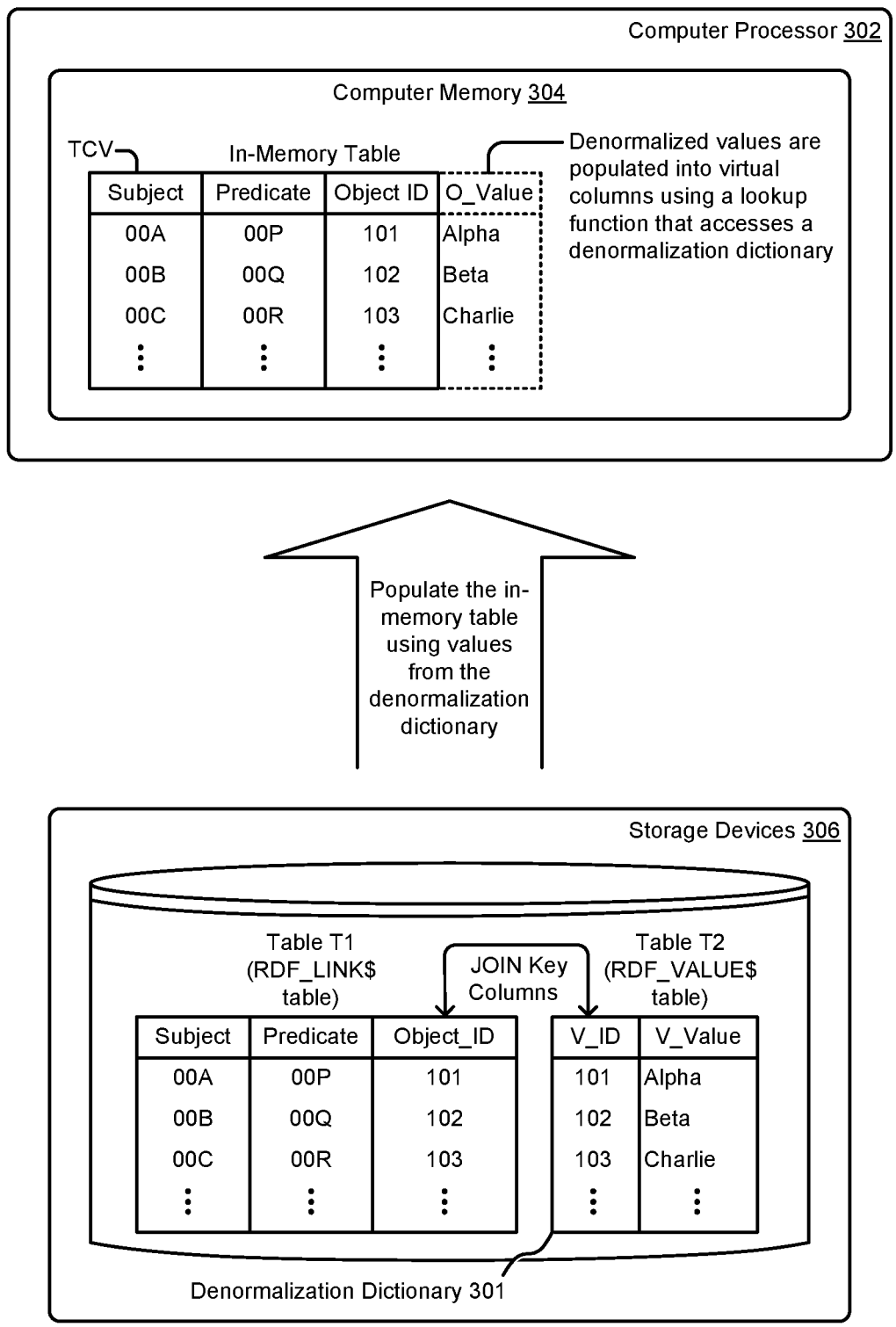
FIG. 2B presents a system having components that facilitate high-performance processing of RDF queries using normalized RDF data and a denormalization dictionary.

FIG. 2B presents system having components that facilitate high-performance processing of RDF queries using normalized RDF data and a denormalization dictionary. As shown, the system is composed of a computer processor 302 that is operatively connected to a computer memory 304. The computer processor is able to access storage devices 306, which in turn store tables. One of the tables in the storage devices 306 is a denormalization dictionary 301. The denormalization dictionary 301 shown as table T2 (e.g., an RDF_VALUE$ table) is used in conjunction with table T1 (e.g., the RDF_LINK$ table as shown). In this specific embodiment, table T1 is formed as an RDF_LINK$ table that includes columns for "Subject", "Predicate", and "Object_ID". Any or all of the columns can comprise normalized data or denormalized data, however for purposes of illustration, this example shows the column "Object_ID" as containing normalized data. The RDF_LINK$ table T1 comprises a normalized column "Object_ID" that can be joined with the RDF_VALUE$ table T2 using the column V_Value. Doing so retrieves the denormalized value for '101', '102', '103' and so on, namely "Alpha", "Beta" and "Charlie", respectively. As such, the virtual columns of the in-memory table can be populated with denormalized values.

In some embodiments a database query language such as SQL can be used to populate the virtual columns of the in-memory table from data stored in persistent storage areas. The following SQL example corresponds to the example shown in FIG. 2B "SELECT_V_Value FROM T1, T2 WHERE T1.Object_ID=T2.V_ID"

Execution of the foregoing SQL can be used to convert the RDF normalized object data column of the RDF_LINK$ table (the "Object_ID" column) into its corresponding denormalized value from the "V_Value" column of the RDF_VALUE$ table. Further SQL statements can move the "V_Value" data to a corresponding virtual column (e.g., the "O_Value" column) of the in-memory table TVC.

In another implementation of denormalizing operations, the in-memory table TVC is populated in a two-step process that includes steps that (1) define a set of functions, each of which pertain to a respective virtual column and then (2) call the function to populate the in-memory table TVC with denormalized values in the virtual column corresponding to the function.

An example function is given in Table 1.

TABLE 1

Example virtual column function definition

| Ref | Information |
|---|---|
| 1 | FUNCTION GetVal (i_id NUMBER) |
| 2 | RETURN VARCHAR2 DETERMINISTIC |
| 3 | IS |
| 4 | r_val VARCHAR2(4000); |
| 5 | BEGIN |
| 6 | execute immediate 'select V_VALUE from RDF_VALUE$ where V_ID = :1' |
| 7 | into r_val using i_id; |
| 8 | RETURN r_val; |
| 9 | END; |

Further, such functions (e.g., one function per virtualized column to be populated) can be called using SQL as given in Table 2.

TABLE 2

Examples of virtual column function calls

| Ref | Information |
|---|---|
| 1 | ALTER TABLE TVC add O_Value generated always as (GetVal(ObjectID)) virtual inmemory ; |
| 2 | ALTER TABLE TVC add S_Value generated always as (GetVal(SubjectID)) virtual inmemory ; |
| 3 | ALTER TABLE TVC add P_Value generated always as (GetVal(PredicateID)) virtual inmemory ; |

The foregoing denormalizing operations are performed once so as to populate the virtual columns of the in-memory table with denormalized values.

In some cases, the RDF_LINK$ table or portion thereof as may pertain to a query workload is brought into computer memory 304 in a first set of operations, and then, in a subsequent set of operations, virtual columns that correspond to columns of denormalized RDF data are defined and populated. In another embodiment, the in-memory table within computer memory 304 is populated row-by-row. More specifically, using a row processing iteration flow such as is shown and described as pertains to FIG. 2C, denormalized values that correspond to normalized values of the same row of the RDF_LINK$ table are brought in by operation of an inner loop of a row processor.

Figure 2C:
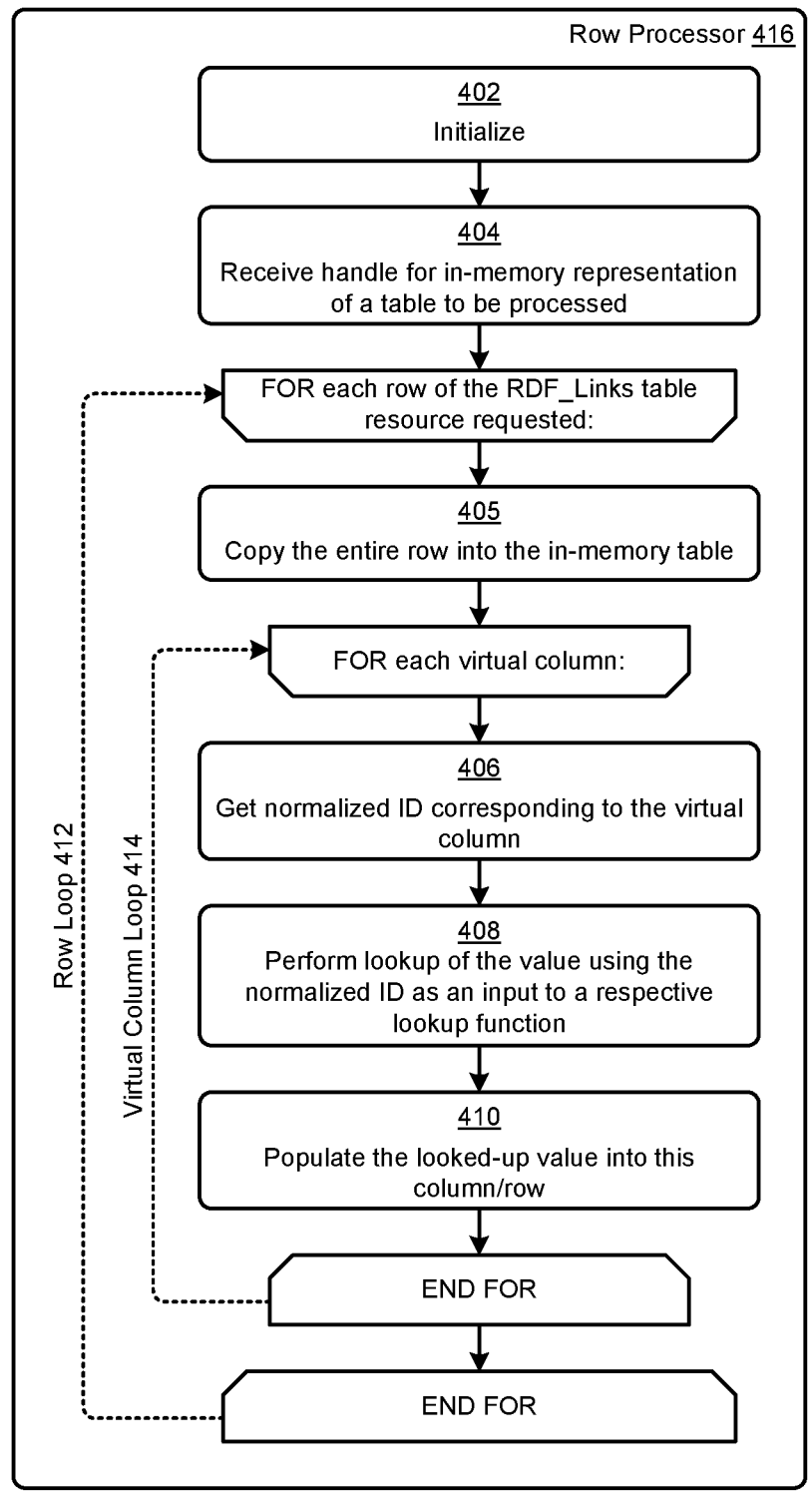
FIG. 2C depicts a row processing iteration flow as performed by a row processor in systems that implement high-performance queries using virtual in-memory table columns, according to some embodiments.

FIG. 2C depicts a row processing iteration flow 2C00 as performed by a row processor in systems that implement high-performance queries using virtual in-memory table columns. As an option, one or more variations of row processing iteration flow 2C00 or any aspect thereof may be implemented in the context of the architecture and functionality of the embodiments described herein. The row processing iteration flow 2C00 or any aspect thereof may be implemented in any environment.

The shown flow includes FOR loops in a nested arrangement. The arrangement of this flow serves to process any of a wide variety of queries. In particular, some recoded queries might include a result set specification that includes many tables and/or other resources (e.g., indexes) and many columns of data. The row processor 416 might initialize itself (at step 402) in preparation for iterating through the FOR loops. The shown outer FOR loop iterates over multiple resources (e.g., tables, indexes, etc.). Strictly as one example pertaining to iterations over multiple tables, one portion of a denormalization dictionary can be stored in one table while another portion of a denormalization dictionary can be stored in another table.

For each resource pertaining to the outer loop, an inner loop that iterates over virtual columns (i.e., the shown virtual column loop 414) is entered. The handle or memory location or other access point of a table is identified (step 404). As shown, once the handle or memory location or other access point of a table is identified, and during each iteration of the shown virtual column loop, the entire then-current row of the RDF resource (e.g., an RDF_LINK$ table) is copied into the in-memory table (step 405).

Next, for each virtual column in that resource, step 406 serves to get the normalized value for the then-current row/column. The normalized value in that row/column is used in a lookup function at step 408 that returns the respective denormalized value. The looked-up value returned for the then-current row/column is populated at step 410 into a corresponding virtual column. The inner loop, namely the virtual column loop 414 ends when all virtual columns have been iterated over. The outer loop, namely the row loop 412 ends when all of the rows of the resource have been processed.

The foregoing flow is merely one example. Another flow might process virtual columns in an outer loop and resources in an inner loop, and/or another flow might process multiple resources before processing virtual columns.

Query Transformation and Processing

Figure 3A:
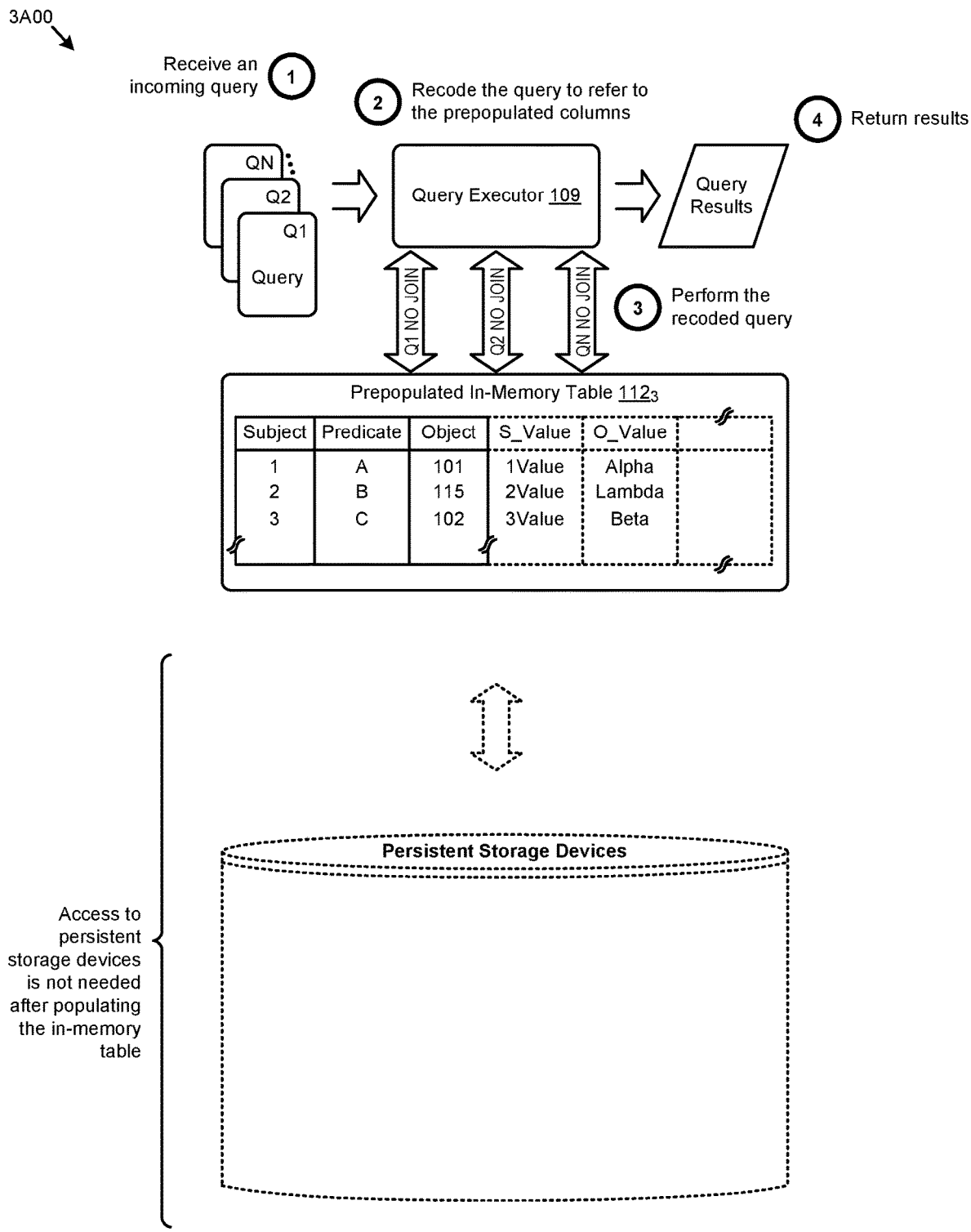
FIG. 3A presents a query transformation technique in a system that facilitates high-performance processing of RDF queries using normalized RDF data and a denormalization dictionary, according to some embodiments.

FIG. 3A presents a query transformation technique 3A00 in a system that facilitates high-performance processing of RDF queries using normalized RDF data and a denormalization dictionary.

In the system as shown, a query executor 109 is situated in the system of FIG. 2B to be able to recode a query and then execute the recoded query. Specifically, the query executor 109 processes the incoming queries (at operation 1 of FIG. 3A). Such processing includes recoding or otherwise modifying each incoming query (at operation 2) to refer to the prepopulated columns of the in-memory table, then processing the recoded query (at operation 3). Query results that are presented by operation 3 are then returned to the requestor (at operation 4). In the performance of operation 3 and operation 4, no JOINs are needed for the execution of the recoded query being performed over the prepopulated in-memory table $112_3$.

In the specific case of processing RDF (e.g., using SPARQL queries), the two tables involved in the JOIN operations might be an RDF_LINK$ table and an RDF_VALUE$ table. Such an example is given in FIG. 3B.

Figure 3B:
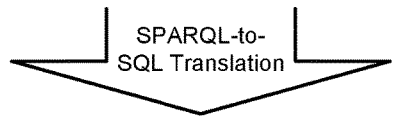
FIG. 3B presents an example of a query transformation technique for modifying JOIN queries into high-performance, according to some embodiments.

FIG. 3B presents an example of a SPARQL query transformation technique 3B00 for modifying JOIN queries into high-performance queries. As an option, one or more variations of such a SPARQL query transformation technique 3B00 or any aspect thereof may be implemented in the context of the architecture and functionality of the embodiments described herein. The shown query transformation technique 3B00 or any aspect thereof may be implemented in any environment.

The example of FIG. 3B is merely one example of SPARQL-to-SQL translation processing. Translation commences upon receipt of a SPARQL query. As shown, a received SPARQL query includes SPARQL query statements that imply a join between two tables.

Such a SPARQL query 502 is translated into a SQL query 504. In the specific example shown, the SQL query 504 includes statements that invoke JOIN operations. One such specific example that invokes a JOIN operation is the SQL clause, "T1.SubjectID=T2.SubjectID". This clause, if executed by a SQL query processor would invoke JOIN operations over tables that are stored in the persistent storage devices. Specifically, the RDF_LINK$ table would be the driving table of a JOIN, thus incurring expensive disk I/O. However, to improve query performance without increasing disk storage requirements, the herein-disclosed techniques are employed to prepopulate an in-memory table such that a recoded SQL query 506 can be performed over the prepopulated in-memory table. As can be seen by inspection of the recoded SQL query 506, the JOIN clause that would incur expensive disk I/O is not present in recoded SQL query 506. Rather, the recoded SQL query 506 merely performs operations over the in-memory table. Since the in-memory table had been prepopulated with the needed demormalized values, expensive disk I/O is not incurred when processing the recoded query.

Referring again to the specific example as shown in FIG. 3B, a SPARQL query 502 is input into a transformer. The transformer converts the SPARQL query into a translated SQL query 504. As shown, the translated SPARQL-to-SQL query includes denormalization using JOIN operations. This JOIN specifies a set of normalized data items that are JOINed with their respective denormalization tables to access denormalized data. However, rather than incurring the expense of performing the translated SQL query 504, portions of the aforementioned denormalization tables can be brought into memory in whole or in part to facilitate high-performance data value lookups in lieu of performing the join-based denormalization statements that appear in the translated SPARQL-to-SQL query 504.

More specifically, and as heretofore discussed, queries that include join operations are computationally expensive, thus, in accordance with the herein-described techniques, SQL query 504 is subjected to recoding into a SQL query that refers to in-memory virtual columns and which recoded query uses high-performance functions when performing denormalization of RDF data found in the columns of the in-memory table. To accomplish this, the recoded SQL query 506 uses operations other than JOIN operations to access in-memory virtual columns, thus eliminating the computational expense of performing queries with JOINs when denormalizing results of a SPARQL query.

Query Recoding Variations Including Filtering and Ordering Semantics

Many SPARQL query constructs include filtering and/or "order by" semantics. The shown SPARQL query 502 includes a query construct, "order by ?x". Unfortunately, the large computing resource demands introduced by SPARQL queries that use or imply JOINs are often further increased when the SPARQL query includes filtering and/or ordering semantics (e.g., via query filters and/or "order by" query constructs). By applying the heretofore-disclosed techniques for query recoding and use of in-memory tables having virtual columns, various filtering and ordering processing can be accomplished while the RDF data tables are available as in-memory tables, thus further reducing the demand for computing resources.

As examples, an order can be specified to cover situations involving any type or representation of RDF data, including situations where there are, for example, no values and/or no blank nodes, and/or no literals, and/or no internationalized resource identifiers (IRIs), etc. In some cases the order-by semantics can be specified using a case statement that specifies an order priority by value type, by numeric value, by date value, by string value, etc. In other cases, "order by" columns can be prepopulated based on SPARQL semantics (e.g., empty or missing values, followed by blank nodes, followed by internationalized resource identifiers, followed by literals), thus improving the performance of queries over the prepopulated columns.

Any of the herein-discussed SPARQL queries that include order-by semantics can be handled during the course of manipulating the in-memory tables.

As pertaining to the foregoing example, the SPARQL query construct, "order by ?x" can be translated into SQL. First a schema is defined, such as shown in Table 3.

TABLE 3

Schema example

| Ref | Information |
|---|---|
| 1 | RDF_LINK$(SubjectID, PredicateID, ObjectID, S_Value, P_Value, O_Value, |
| 2 | S_OrderType, S_OrderNum, S_OrderDate, P_OrderType, P_OrderNum, |
| 3 | P_OrderDate, O_OrderType, O_OrderNum, O_OrderDate); |
| 4 | RDF_VALUE$(V_ID, V_Value, V_ValueType, V_LanguageType); |

Given such a schema, then the aforementioned SPARQL query construct, "order by ?x" would be translated into SQL "ORDER BY CASE" constructs. Table 4 shows SQL for a corresponding "ORDER BY CASE" construct.

TABLE 4

Example of SPARQL query order semantics as translated into SQL

| Ref | Information |
|---|---|
| 1 | FROM RDF_LINK$ T1, RDF_LINK$ T2, RDF_VALUE$ V1, RDF_VALUE$ V2, RDF_VALUE$ V3 |
| 2 | ORDER BY CASE WHEN (V1.V_ValueType IS NULL) THEN 0 |
| 3 | WHEN (V1. V_ValueType IN ('BLN','BN')) THEN 1 |
| 4 | WHEN (V1. V_ValueType IN ('URI','UR')) THEN 2 |
| 5 | WHEN (V1. V_ValueType IN ('PL','PLL',..........)) THEN (CASE WHEN (V1.V_LanguageType IS NOT NULL) THEN 5... |

The semantics of the case statements of Table 4 can be executed for every row at runtime during processing over the in-memory table. More specifically, after parsing the transformed SPARQL query into SQL statements, the semantics of the case statements can be processed as: (1) materialize value type and values in RDF_VALUE$ table then, (2) observe order specifications such as "ORDER BY T1.S_OrderType, T1.S_OrderNum, T1.S_OrderDate, . . . " when storing in the materialized in-memory table. During denormalization lookups, the intended ordering and filtering are observed, thus further reducing demand for computing resources when processing a SPARQL query in accordance with the disclosed techniques.

Figure 4:
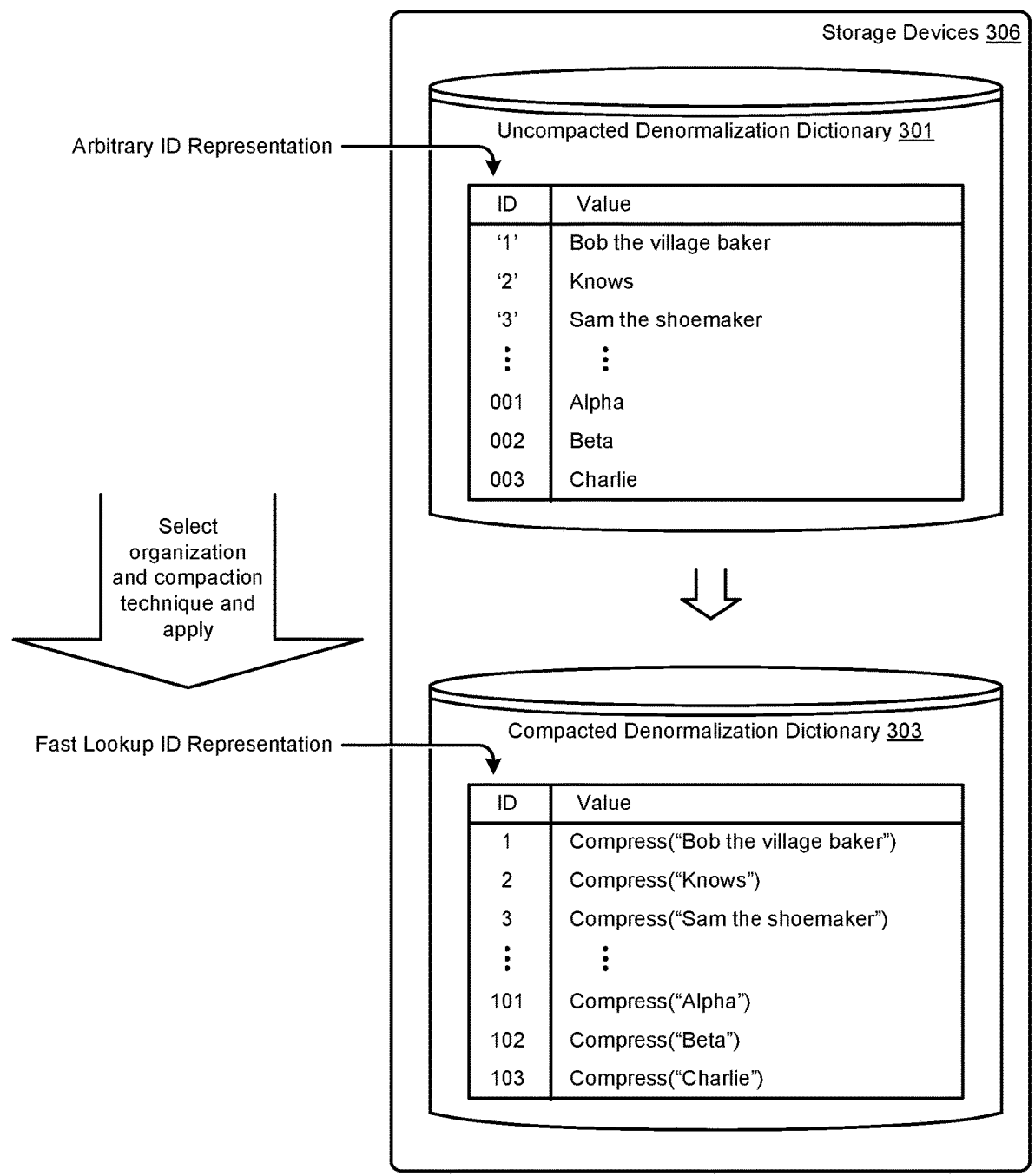
FIG. 4 presents a denormalization dictionary compaction technique as used in systems that implement lookups of denormalized data using in-memory normalized data that is populated into virtual columns, according to some embodiments

FIG. 4 presents a denormalization dictionary compaction technique. In many cases the denormalization dictionary 301 can be compacted to form a compacted denormalization dictionary 303. As shown, both the "ID" column of the compacted denormalization dictionary 303 as well as the "Value" column of the compacted denormalization dictionary can be formulated to facilitate fast lookups. Moreover, the "Value" column might comprise only compressed values.

In this manner, a fast lookup ID representation can be formed from any arbitrary ID representation. In the example shown, a string ID value of '1' might be represented as an integer having a value of 1. Also, as shown, the value "Bob the village baker" as given in an uncompacted denormalization dictionary might be compressed into a shorter form, such as, for example, "BoBt%^g" or some such compressed value as given by the compression function. Any known organization techniques and/or compaction techniques can be used in converting an uncompacted denormalization dictionary 301 into a compacted denormalization dictionary 303.

An uncompacted denormalization dictionary 301 can be formed into a compacted denormalization dictionary 303 at any moment in time, and new entries can be added at any moment in time. In the depiction of FIG. 4, a first instance of an uncompacted denormalization dictionary 301 is formed, perhaps based on a random or "as encountered" entry order. In the specific instance of the shown uncompacted denormalization dictionary 301, the ID is defined in a manner that merely guarantees uniqueness among all values in the ID column so as to guarantee a one-to-one relationship between a normalized ID (see column 'ID') and its respective denormalized value (see column 'Value'). This embodiment can be improved by selecting a compaction technique and an organization technique and applying such techniques to a denormalization dictionary (e.g., the shown uncompacted denormalization dictionary 301) to form a high-performance denormalization dictionary (e.g., compacted denormalization dictionary 303). The values in the ID column might be purely numeric (e.g., binary values) or might be formed in another manner that suits compaction and/or organization for high-performance access. In some cases, the stored values in the "ID" column might comprise compacted or uncompacted normalized RDF data, and the stored values in the "Value" column might comprise compacted or uncompacted denormalized RDF data.

As shown, the ID column of compacted denormalization dictionary 303 comprises numeric values in a strict order so as to facilitate high-performance random access, such as the random access as might be performed by the lookup function (e.g., using a $log_2$ binary lookup). In other cases, the ID column of compacted denormalization dictionary 303 comprises hashed keys (e.g., for fast, O(1) lookups).

Using the foregoing techniques, an in-memory data structure (e.g., a database table, a virtual column, etc.) can be constructed by parsing a given JOIN-oriented query to determine the join columns, which determination can in turn be used to populate an in-memory data structure. Once so populated, the in-memory data structure can be operated over without use of JOIN clauses or operations.

Additional Embodiments of the Disclosure

Additional Practical Application Examples

Figure 5:
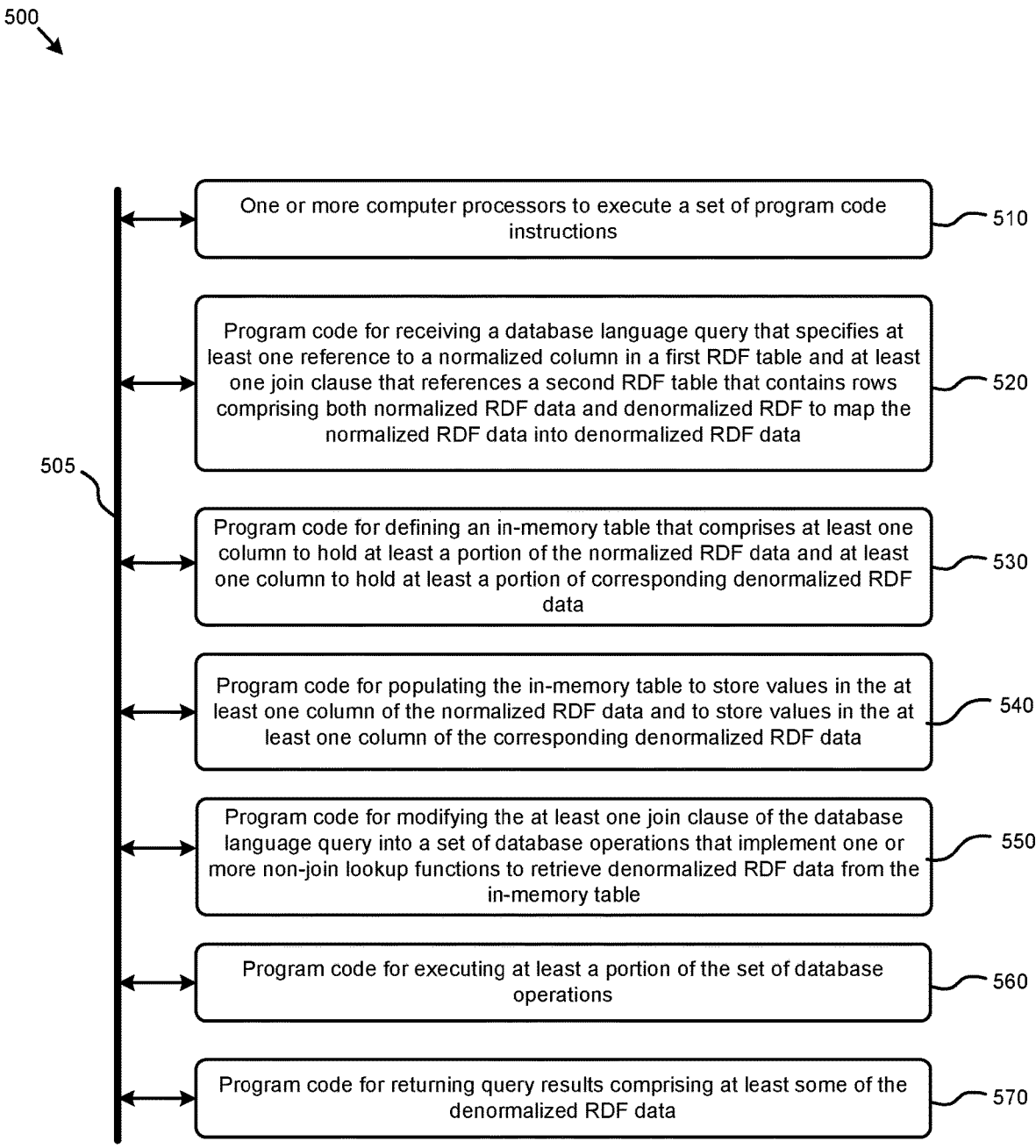
FIG. 5 depicts system components as arrangements of computing modules that are interconnected so as to implement certain of the herein-disclosed embodiments.

FIG. 5 depicts system components as arrangements of computing modules that are interconnected so as to implement certain of the herein-disclosed embodiments. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The shown embodiment implements a portion of a computer system, presented as system 500, comprising one or more computer processors to execute a set of program code instructions (module 510) and modules for accessing memory to hold program code instructions to perform: receiving a database language query that specifies at least one reference to a normalized column in a first RDF table and at least one join clause that references a second RDF table that contains rows comprising both normalized RDF data and denormalized RDF to map the normalized RDF data into denormalized RDF data (module 520); defining an in-memory table that comprises at least one column to hold at least a portion of the normalized RDF data and at least one column to hold at least a portion of corresponding denormalized RDF data (module 530); populating the in-memory table to store values in the at least one column of the normalized RDF data and to store values in the at least one column of the corresponding denormalized RDF data (module 540); modifying the at least one join clause of the database language query into a set of database operations that implement one or more non-join lookup functions to retrieve denormalized RDF data from the in-memory table (module 550); executing at least a portion of the set of database operations (module 560); and returning query results comprising at least some of the denormalized RDF data (module 570).

Any one or more of the system components 500 can be implemented in a database system that handles SPAQL queries and implements RDF tables that are normalized for "subject", "predicate", and "object" so as to efficiently manage the RDF data. As aforementioned, an RDF_LINK$ table might contain normalized IDs pertaining to subject, predicate, and object, and an RDF_VALUE$ table might contain corresponding values for each of the IDs. Inasmuch as SPARQL queries incur frequent joins of RDF_LINK$ table and RDF_VALUE$ table (e.g., such as whenever values are needed to process FILTER and ORDER BY queries, or to present users with the final results) any variations of the foregoing techniques can be used individually or in combination to achieve high-performance SPARQL query processing.

More specifically, in exemplary high-performance database systems, the herein-discussed in-memory tables comprising RDF_VALUE$ table rows and the herein-discussed in-memory table access techniques serve to remove the processing load of performing JOIN operations between the RDF_LINK$ and RDF_VALUE$ tables by implementing in-memory virtual columns. Query performance is improved without increasing disk storage requirements. The in-memory virtual columns can be populated from a compressed or uncompressed RDF_VALUE$ tables (e.g., for looking-up denormalized data from normalized data). An in-memory table can be formed by adding virtual columns to all or a portion of an RDF_LINK$ table, and, by using lookup operations rather than JOIN operations when processing query statements over the in-memory table, the computational expense of joins can be eliminated.

Many RDF applications operate over a virtual model of RDF data. The virtual model comprises a partition or a few partitions of RDF_LINK$ table, so its size is small enough to be able to fit into the in-memory tables, thus reducing or eliminating access to slower persistent storage devices.

System Architecture Overview

Additional System Architecture Examples

Figure 6:
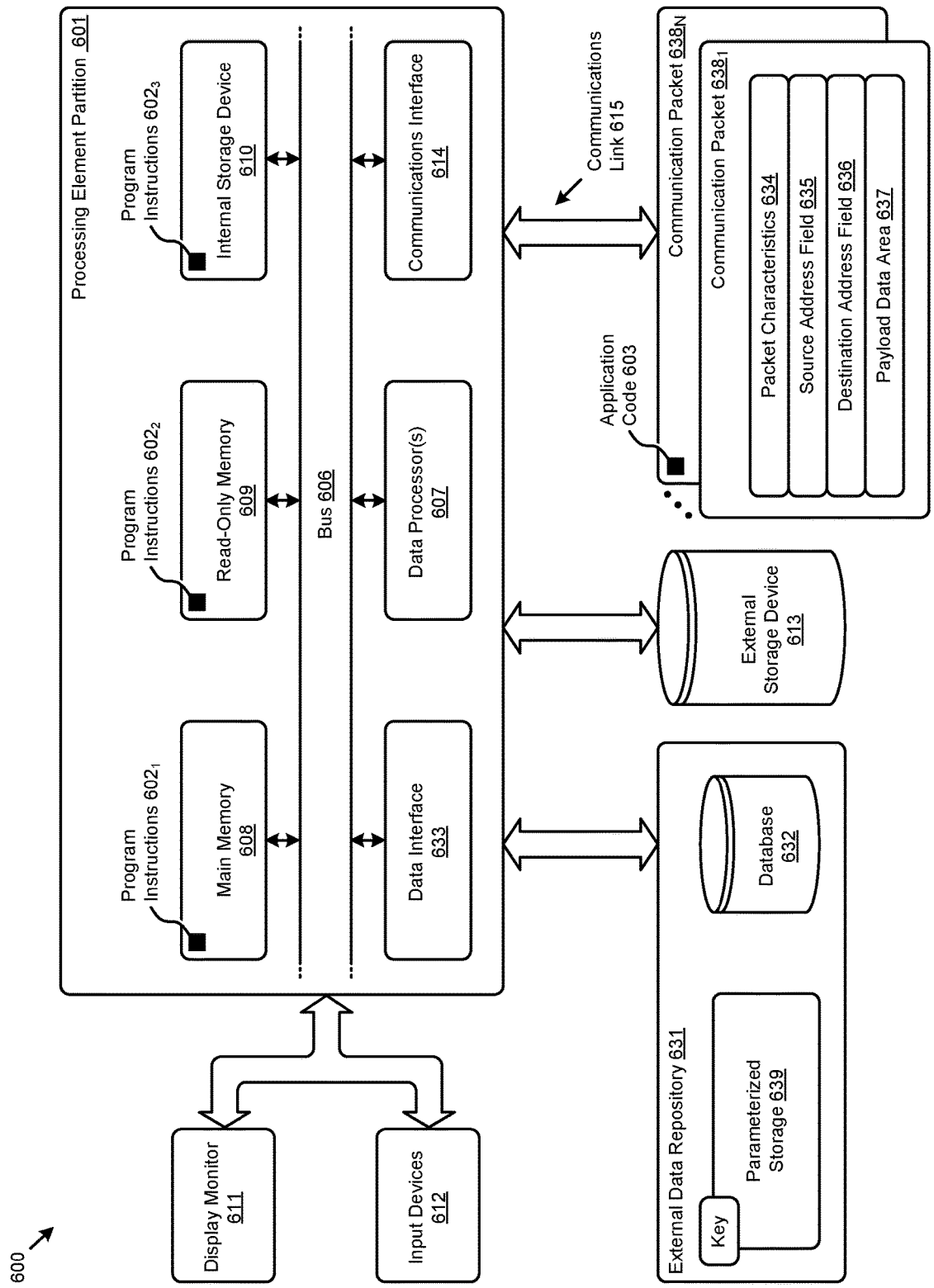
FIG. 6 depicts an example architecture suitable for implementing embodiments of the present disclosure.

FIG. 6 depicts an example architecture suitable for implementing embodiments of the present disclosure. Computer system 600 includes a bus 606 or other communication mechanism for communicating information. The bus interconnects subsystems and devices such as a CPU, or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. The shown computer system 600 further comprises a display 611 (e.g., CRT or LCD), various input devices 612 (e.g., keyboard, cursor control), and an external data repository 631.

According to an embodiment of the disclosure, computer system 600 performs specific operations by data processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 600 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

The communications link 615 can be configured to transmit (e.g., send, receive, signal, etc.) any types of communications packets (e.g., communications packet $638_1$, communications packet $638_N$) comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 600. According to certain embodiments of the disclosure, two or more instances of computer system 600 coupled by a communications link 615 (e.g., LAN, PSTN, or wireless network) may perform the sequence of instructions required to practice embodiments of the disclosure using two or more instances of components of computer system 600.

The computer system 600 may transmit and receive messages such as data and/or instructions organized into a data structure (e.g., communications packets). The data structure can include program instructions (e.g., application code 603), communicated through communications link 615 and communications interface 614. Received program code may be executed by data processor 607 as it is received and/or stored in the shown storage device or in or upon any other non-volatile storage for later execution. Computer system 600 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to in-memory lookups of denormalized data using normalized tables and a dictionary. A module may include one or more state machines and/or combinational logic used to implement or facilitate the operational and/or performance characteristics of in-memory lookups of denormalized RDF data using normalized RDF tables and a dictionary.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of in-memory lookups of denormalized RDF data using normalized RDF tables and a dictionary). Such files or records can be brought into and/or stored in volatile or non-volatile memory.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for processing SPARQL queries comprising:
receiving a database language query that specifies at least one reference to a normalized column in a first RDF table and at least one join clause that references a second RDF table that contains rows comprising both normalized RDF data and denormalized RDF to map the normalized RDF data into denormalized RDF data;
defining an in-memory table that comprises at least one column to hold at least a portion of the normalized RDF data and at least one column to hold at least a portion of corresponding denormalized RDF data;
populating the in-memory table to store values in the at least one column of the normalized RDF data and to store values in the at least one column of the corresponding denormalized RDF data;
modifying the at least one join clause of the database language query into a set of database operations that implement one or more lookup functions to retrieve denormalized RDF data from the in-memory table;
executing at least a portion of the set of database operations; and
returning query results comprising at least some of the denormalized RDF data.

2. The method of claim 1, further comprising defining virtual columns that are used to form denormalized RDF data columns of the in-memory table.

3. The method of claim 2, wherein populating the in-memory table comprises populating at least some of the virtual columns with uncompacted denormalized RDF data.

4. The method of claim 3, wherein the populating of the at least some of the virtual columns comprises populating by priority of, blank nodes, followed by literals, followed by internationalized resource identifiers.

5. The method of claim 1, wherein the second RDF table comprises a denormalization dictionary having at least one normalized RDF data column and at least one denormalized RDF data column.

6. The method of claim 1, wherein the second RDF table comprises a compacted denormalization dictionary.

7. The method of claim 6, wherein the compacted denormalization dictionary comprises an ID column to store normalized RDF data and a value column to store compacted denormalized RDF data.

8. The method of claim 1, wherein the query results that comprise at least some of the denormalized RDF data are semantically identical to results as if the at least one join clause had been executed.

9. A computer readable medium, embodied in a non-transitory computer readable medium, the non-transitory computer readable medium having stored thereon a sequence of instructions which, when stored in memory and executed by one or more processors causes the one or more processors to perform a set of acts for processing SPARQL queries, the acts comprising:
receiving a database language query that specifies at least one reference to a normalized column in a first RDF table and at least one join clause that references a second RDF table that contains rows comprising both normalized RDF data and denormalized RDF to map the normalized RDF data into denormalized RDF data;
defining an in-memory table that comprises at least one column to hold at least a portion of the normalized RDF data and at least one column to hold at least a portion of corresponding denormalized RDF data;
populating the in-memory table to store values in the at least one column of the normalized RDF data and to store values in the at least one column of the corresponding denormalized RDF data;
modifying the at least one join clause of the database language query into a set of database operations that implement one or more lookup functions to retrieve denormalized RDF data from the in-memory table;
executing at least a portion of the set of database operations; and
returning query results comprising at least some of the denormalized RDF data.

10. The computer readable medium of claim 9, further comprising instructions which, when stored in memory and executed by the one or more processors causes the one or more processors to perform acts of defining virtual columns that are used to form denormalized RDF data columns of the in-memory table.

11. The computer readable medium of claim 10, wherein populating the in-memory table comprises populating at least some of the virtual columns with uncompacted denormalized RDF data.

12. The computer readable medium of claim 11, wherein the populating of the at least some of the virtual columns comprises populating by priority of, blank nodes, followed by literals, followed by internationalized resource identifiers.

13. The computer readable medium of claim 9, wherein the second RDF table comprises a denormalization dictionary having at least one normalized RDF data column and at least one denormalized RDF data column.

14. The computer readable medium of claim 9, wherein the second RDF table comprises a compacted denormalization dictionary.

15. The computer readable medium of claim 14, wherein the compacted denormalization dictionary comprises an ID column to store normalized RDF data and a value column to store compacted denormalized RDF data.

16. The computer readable medium of claim 9, wherein the query results that comprise at least some of the denormalized RDF data are semantically identical to results as if the at least one join clause had been executed.

17. A system for processing SPARQL queries comprising:
a storage medium having stored thereon a sequence of instructions; and
one or more processors that execute the instructions to cause the one or more processors to perform a set of acts, the acts comprising,
receiving a database language query that specifies at least one reference to a normalized column in a first RDF table and at least one join clause that references a second RDF table that contains rows comprising both normalized RDF data and denormalized RDF to map the normalized RDF data into denormalized RDF data;
defining an in-memory table that comprises at least one column to hold at least a portion of the normalized RDF data and at least one column to hold at least a portion of corresponding denormalized RDF data;
populating the in-memory table to store values in the at least one column of the normalized RDF data and to store values in the at least one column of the corresponding denormalized RDF data;
modifying the at least one join clause of the database language query into a set of database operations that implement one or more lookup functions to retrieve denormalized RDF data from the in-memory table;
executing at least a portion of the set of database operations; and
returning query results comprising at least some of the denormalized RDF data.

18. The system of claim 17, wherein populating the in-memory table comprises populating at least one virtual column with uncompacted denormalized RDF data.

19. The system of claim 18, wherein the populating of the at least one virtual column comprises populating by priority of, blank nodes, followed by literals, followed by internationalized resource identifiers.

20. The system of claim 17, wherein the query results that comprise at least some of the denormalized RDF data are semantically identical to results as if the at least one join clause had been executed.

* * * * *